(12) United States Patent
Fujimoto et al.

(10) Patent No.: US 9,587,957 B2
(45) Date of Patent: Mar. 7, 2017

(54) VEHICLE POSITION DISPLAY CONTROLLER AND VEHICLE POSITION SPECIFYING METHOD

(71) Applicants: Kohei Fujimoto, Tokyo (JP); Masatoshi Fujii, Tokyo (JP); Tadatomi Ishigami, Tokyo (JP); Hirokazu Chiyonobu, Tokyo (JP); Atsushi Maeda, Tokyo (JP)

(72) Inventors: Kohei Fujimoto, Tokyo (JP); Masatoshi Fujii, Tokyo (JP); Tadatomi Ishigami, Tokyo (JP); Hirokazu Chiyonobu, Tokyo (JP); Atsushi Maeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 14/763,772

(22) PCT Filed: Mar. 1, 2013

(86) PCT No.: PCT/JP2013/055630
§ 371 (c)(1),
(2) Date: Jul. 27, 2015

(87) PCT Pub. No.: WO2014/132432
PCT Pub. Date: Sep. 4, 2014

(65) Prior Publication Data
US 2015/0362326 A1    Dec. 17, 2015

(51) Int. Cl.
*G05D 1/00* (2006.01)
*G01C 21/36* (2006.01)
*G01C 21/30* (2006.01)

(52) U.S. Cl.
CPC .......... *G01C 21/367* (2013.01); *G01C 21/30* (2013.01)

(58) Field of Classification Search
CPC .............................. G01C 21/367; G01C 21/30
See application file for complete search history.

(56) References Cited

U.S. PATENT DOCUMENTS

2008/0033621 A1    2/2008  Nakamura et al.
2014/0126333 A1*   5/2014  Lohrmann .............. G01S 15/60
                                                367/91

(Continued)

FOREIGN PATENT DOCUMENTS

CN    102620742 A    8/2012
CN    102735256 A    10/2012

(Continued)

OTHER PUBLICATIONS

Chinese Office Action issued Feb. 24, 2016 in Chinese Counterpart Application No. 201380074121.4 with partial English Translation.

*Primary Examiner* — Ian Jen
(74) *Attorney, Agent, or Firm* — Birch, Stewart, Kolasch & Birch, LLP (57) ABSTRACT

A vehicle position display controller performs a branch determination processing of determining whether a vehicle has entered a branch road. In addition, in a case where a connecting road through which a currently traveled road is connected to a road extending in parallel with the currently traveled road lies ahead of a position of the vehicle, the vehicle position display controller performs a road shape conversion processing of subjecting the road extending in parallel to the branch determination processing on the assumption that the road extending in parallel is the branch road by making a correction of an angle between the currently traveled road and the connecting road. However, in a case where the vehicle travels at a speed equal to or greater than a predetermined speed, the vehicle position display controller does not perform the road shape conversion processing.

14 Claims, 8 Drawing Sheets

(56) References Cited

U.S. PATENT DOCUMENTS

| | | | | |
|---|---|---|---|---|
| 2014/0129136 A1* | 5/2014 | Celia | G01C 21/00 | 701/445 |
| 2014/0156183 A1* | 6/2014 | Windeler | G08G 1/144 | 701/454 |
| 2014/0184649 A1* | 7/2014 | Bak | G06T 11/206 | 345/660 |
| 2014/0207357 A1* | 7/2014 | Shimotani | G08G 1/096725 | 701/93 |
| 2015/0369613 A1* | 12/2015 | Stadler | G01C 21/32 | 701/537 |
| 2016/0011854 A1* | 1/2016 | Furumoto | G10L 15/22 | 704/249 |
| 2016/0033297 A1* | 2/2016 | Konishi | G01C 21/3685 | 701/31.4 |
| 2016/0148503 A1* | 5/2016 | Kachi | G06F 3/0481 | 701/117 |
| 2016/0241789 A1* | 8/2016 | Mayuzumi | H04N 5/247 | |

FOREIGN PATENT DOCUMENTS

| | | |
|---|---|---|
| JP | 2-257013 A | 10/1990 |
| JP | 2008-56226 A | 3/2008 |
| JP | 2008-139153 A | 6/2008 |
| JP | 2011-202977 A | 10/2011 |

* cited by examiner

VEHICLE POSITION DISPLAY CONTROLLER AND VEHICLE POSITION SPECIFYING METHOD

TECHNICAL FIELD

The present invention relates to a vehicle position display controller and a vehicle position specifying program that are employed in, for example, a navigation apparatus.

BACKGROUND ART

In general, in the map data to be included in navigation apparatuses, a road network is converted into electronic data indicated by a line (link) representing each road and a connection point (node) of roads. In the navigation apparatuses, the processing of determining the currently traveled road on the basis of, for example, the travel distance and the traveling direction of a vehicle is performed with consideration given to errors caused by such conversion and errors in the vehicle position information (see, for example, Patent Document 1).

PRIOR ART DOCUMENT

Patent Document

Patent Document 1: Japanese Patent Application Laid-Open No. 02-257013 (1990)

SUMMARY OF INVENTION

Problems to be Solved by the Invention

In a case where a plurality of roads, such as a main road and a side road of the road, extend in parallel and the vehicle travels through a place in which the distance between the adjacent roads is small, the navigation apparatus has difficulty in precisely determining which road the vehicle is traveling. This is due to the fact that, for example, the position and the travel direction of the vehicle change only slightly even if the vehicle has entered the adjacent road. When the navigation apparatus erroneously determines the currently traveled road, the screen of the navigation apparatus displays the own vehicle mark indicating the current position of the vehicle in the wrong place, and thus, the user is struck by the incongruity. In addition, the navigation apparatus may provide erroneous route guidance.

The present invention therefore has been made to solve the problems described above and an object thereof is to provide a vehicle position display controller and a vehicle position specifying program capable of providing accurate determination of vehicle position between roads extending in parallel.

Means to Solve the Problems

A vehicle position display controller according to the present invention is a vehicle position display controller that causes a display apparatus to display a map and a position of a vehicle and includes: a map data acquisition unit that acquires map data; a vehicle position specifying unit that specifies a position of a vehicle; a vehicle positioning information acquisition unit that acquires variations in the position and variations in a traveling direction of the vehicle; a branch determination unit that performs, at a time when the vehicle passes through a connection point of a currently traveled road and a branch road that branches off from the currently traveled road in a direction at an angle equal to or smaller than a predetermined angle, a branch determination processing of determining whether the vehicle has entered the branch road on the basis of results obtained by accumulating, for a section including the connection point, the variations in the position and the variations in the traveling direction of the vehicle acquired by the vehicle positioning information acquisition unit; and a road shape converter that, in a case where a connecting road through which the currently traveled road is connected to a road extending in parallel with the currently traveled road lies ahead of the position of the vehicle, subjects the road extending in parallel to the branch determination processing on the assumption that the road extending in parallel is the branch road by making a correction to an angle between the currently traveled road and the connecting road such that the angle is equal to or smaller than the predetermined angle. In a case where the vehicle travels at a speed equal to or greater than a predetermined speed, the road shape converter does not make the correction.

Effects of the Invention

In a case of diverging from the currently traveled road and entering the road (for example, the side road) extending in parallel, the vehicle generally decelerates short of the connection site of the roads. While the vehicle travels at a high speed, the probability is extremely low that the vehicle will enter the side road, and thus, there is no need to make the correction in the road shape conversion processing in order to keep the accuracy of determining the vehicle position. In addition, an excessive correction in the road shape conversion processing is avoided, which can suppress the occurrence of erroneous determination resulting from the branch determination processing.

These and other objects, features, aspects and advantages of the present invention will become more apparent from the following detailed description of the present invention when taken in conjunction with the accompanying drawings.

DESCRIPTION OF EMBODIMENTS

First Embodiment

The following firstly describes a "branch determination processing" and a "road shape conversion processing" that are the techniques by which a navigation apparatus determines a position of a vehicle.

The branch determination processing is the processing of determining, at a time when a specified vehicle passes through the connection site of the currently traveled road and another road branching off from the road, whether the vehicle has entered the other road. This processing is intended for a road (branch road) that branches off, from the road on which the vehicle is traveling, in a direction at an angle equal to or smaller than a predetermined angle (for example, at an angle equal to or smaller than 30 degrees). The examples of the above include a ramp that branches off from a general lane to lead into an expressway interchange, a ramp that branches off from the main lane of an expressway to lead into an exit, and a junction on an expressway.

Figure 1:
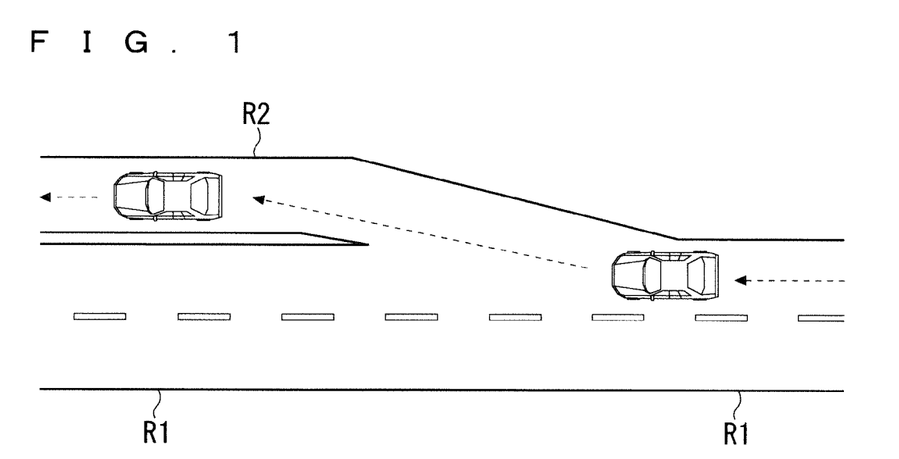
FIG. 1 A view describing a branch determination processing.
Figure 2:
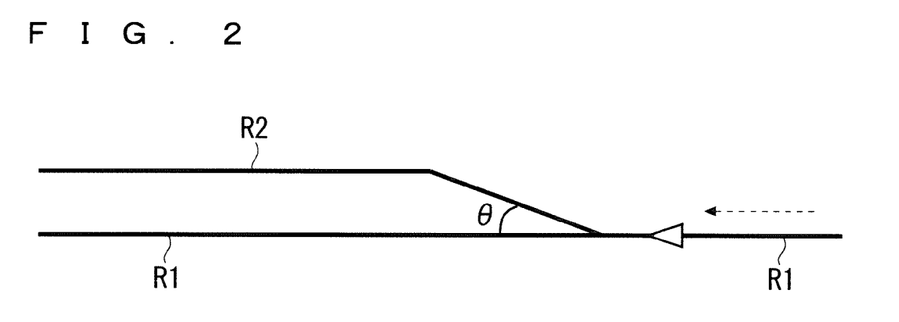
FIG. 2 A view describing the branch determination processing.

In a case where a road is provided as shown in FIG. 1, the road is stored in the map data as the shape shown in FIG. 2 (the triangle in FIG. 2 is an own vehicle mark and indicates the position and the traveling direction of the vehicle). If a road R2 branches off from a currently traveled road R1 at an angle θ that is equal to or smaller than the predetermined angle, the branch determination processing is performed at a time when the vehicle position passes through the branch point of the roads.

The position and the traveling direction of the vehicle are measured through, for example, a global navigation satellite system (GNSS) receiver or an azimuth sensor mounted on the vehicle, but the resulting measurement values have some errors. Consequently, in the navigation apparatus, in many cases, the processing of ignoring minute changes in the position and the traveling direction of the vehicle is performed on the assumption that these changes are errors. In a case where the angle θ at which the road R2 branches from the currently traveled road R1 is small, the position and the traveling direction of the vehicle change only slowly even with the vehicle's entry into the road R2. Unfortunately, the usual vehicle position determination processing may ignore such changes, erroneously providing the determination that the vehicle keeps traveling on the road R1. In the branch determination processing, the processing described below is performed to deal with such issue.

In the branch determination processing, minute changes in the position and changes in the traveling direction of the vehicle are separately accumulated during the vehicle's traveling in the section (branch determination section) of a predetermined length including the connection point of the currently traveled road R1 and the road R2, and on the basis of the respective accumulation results, the determination whether the vehicle keeps traveling on the road R1 or the vehicle has entered the road R2 is provided. Note that the predetermined length may be variable depending on the road types, the road width, the number of traffic lanes, and the vehicle speed or the predetermined length may be set at a fixed value.

For example, assume that the vehicle has entered the road R2 from the road R1 as shown in FIG. 1. In the branch determination processing, while the vehicle position is specified in the branch determination section shown in FIG. 3, variations in the position and variations in the traveling direction of the vehicle are accumulated separately.

While the accumulated value of variations in the position of the vehicle and the accumulated value of variations in the traveling direction of the vehicle do not exceed the respective threshold values, the vehicle position is provisionally specified based on the determination that the vehicle keeps traveling on the road R1. In addition, until the vehicle reaches the end point of the branch determination section, the position (the broken-line triangle shown in FIG. 3) given on the supposition that the vehicle has entered the road R2 is specified as the potential position.

Figure 3:
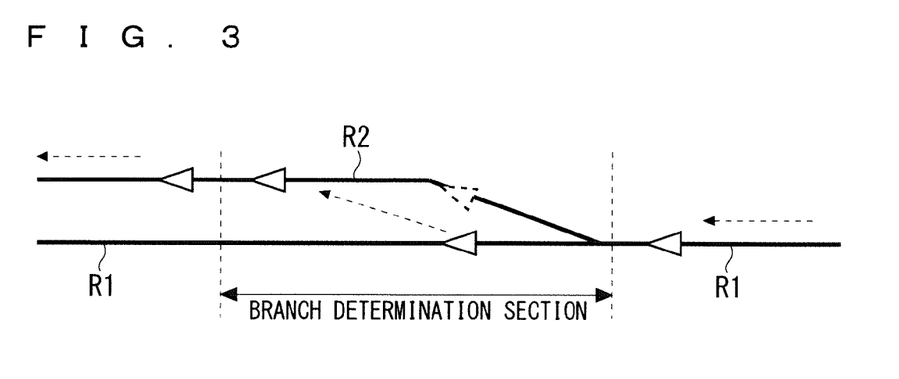
FIG. 3 A view describing the branch determination processing.

Then, when the accumulated value of variations in the position of the vehicle and the accumulated value of variations in the traveling direction of the vehicle exceed the respective threshold values, the vehicle position is changed to the above-described potential position on the road R2 based on the determination that the vehicle has entered the road R2. In a case where the accumulated value of variations in the position of the vehicle and the accumulated value of variations in the traveling direction of the vehicle do not reach the respective threshold values at a time when the vehicle position reaches the end point of the branch determination section, the determination that the vehicle keeps traveling on the road R1 is confirmed.

Thus, even if the angle θ at which the road R2 branches off from the currently traveled road R1 is small and the position and the traveling direction of the vehicle therefore change only slowly, the branch determination processing can provide the determination of the vehicle position on the basis of the accumulated values of variations in the position of the vehicle and variations in the traveling direction of the vehicle in the branch determination section, allowing accurate determination of the vehicle position (currently traveled road).

Meanwhile, the road shape conversion processing is the processing of expanding the applicability of the branch determination processing described above to include the road extending in parallel with the currently traveled road.

Figure 4:
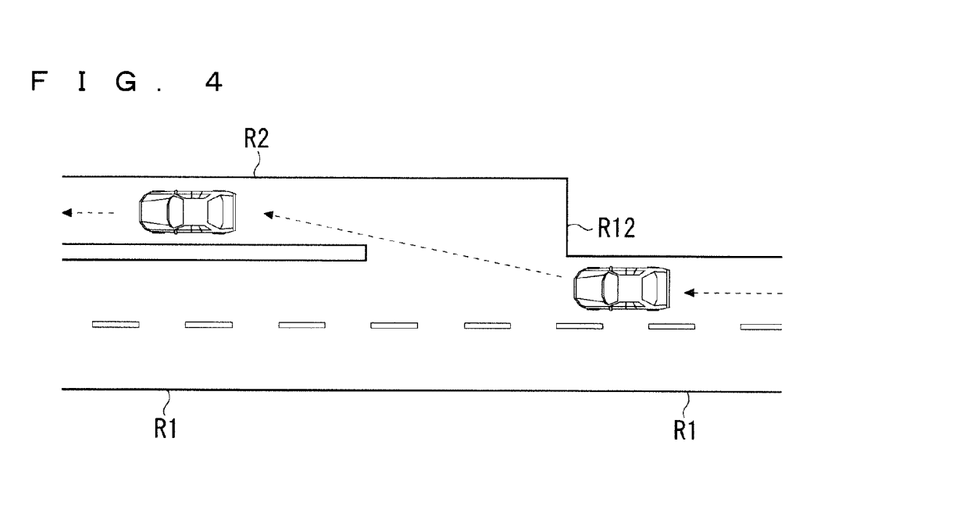
FIG. 4 A view describing a road shape conversion processing.
Figure 5:
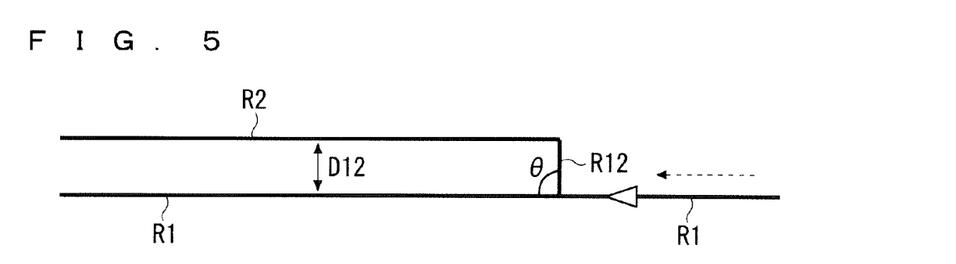
FIG. 5 A view describing the road shape conversion processing.

For example, as shown in FIG. 4, in a case where the road R1 and the road R2 extending in parallel with the road R1 are connected to each other in a crank shape through a short road (connecting road) R12, these roads are stored in the map data as the shape shown in FIG. 5. The road R1 and the road R2 shown in FIG. 4 are not originally subjected to the branch determination processing because the road R1 and the connecting road R12 form the angle θ of approximately 90 degrees in the map data.

In a case where a distance D12 between the road R1 and the road R2 is small, meanwhile, the vehicle crosses the connecting road R12 diagonally at the time of entry into the road R2 from the road R1, thereby leaving a trace similar to that in FIG. 1. That is, the position and the traveling direction of the vehicle change only slowly even with the vehicle's entry into the road R2, so that the determination that the vehicle keeps traveling on the road R1 may be erroneously provided in the usual vehicle position determination processing.

Figure 6:
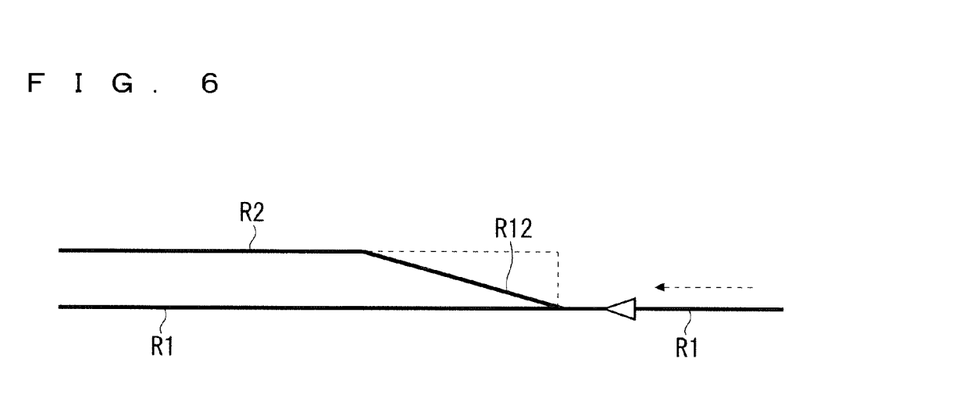
FIG. 6 A view describing the road shape conversion processing.

In the road shape conversion processing, in a case where the connecting road R12 through which the currently traveled road R1 is connected to the road R2 extending in parallel with the currently traveled road R1 lies ahead of the vehicle position and the connecting road R12 is equal to or shorter than the predetermined length, a correction is made to the angle θ between the road R1 and the connecting road R12 such that the angle θ is set at an angle subjected to the branch determination processing (for example, equal to or smaller than 30 degrees). That is, the map data of the road (road data) shown in FIG. 5 is converted into the shape shown in FIG. 6. Consequently, the branch determination processing is performed on the road R1 and the road R2 on the assumption that the road R2 and the connecting road R12 are the branch roads subjected to the branch determination processing, so that whether the vehicle is traveling on the road R1 or the road R2 can be accurately determined.

Figure 7:
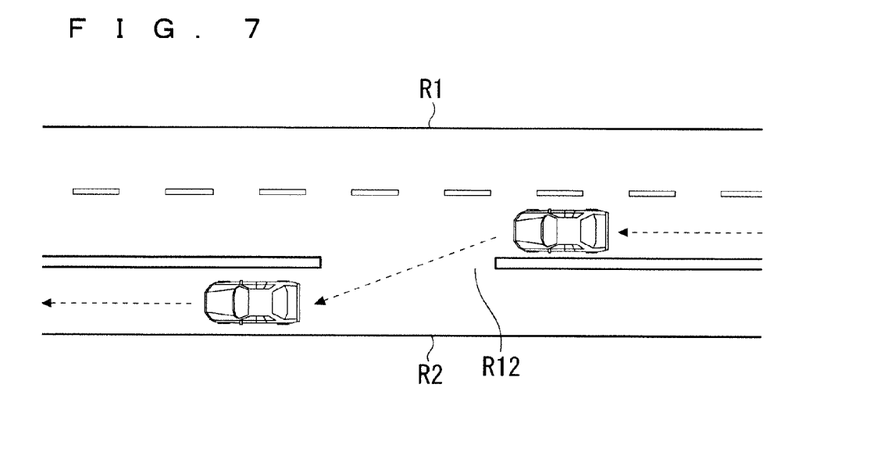
FIG. 7 A view describing an example in which the road shape conversion processing is applied to a connecting road between a main road and a side road.

The road shape conversion processing and the branch determination processing are applicable where the road R1 on which the vehicle is traveling and the road R2 extending in parallel with the road R1 are provided as the main road and the side road as shown in FIG. 7 (where the road R2 (referred to as "narrow street") that is narrow extends in parallel with the road R1).

Figure 8:
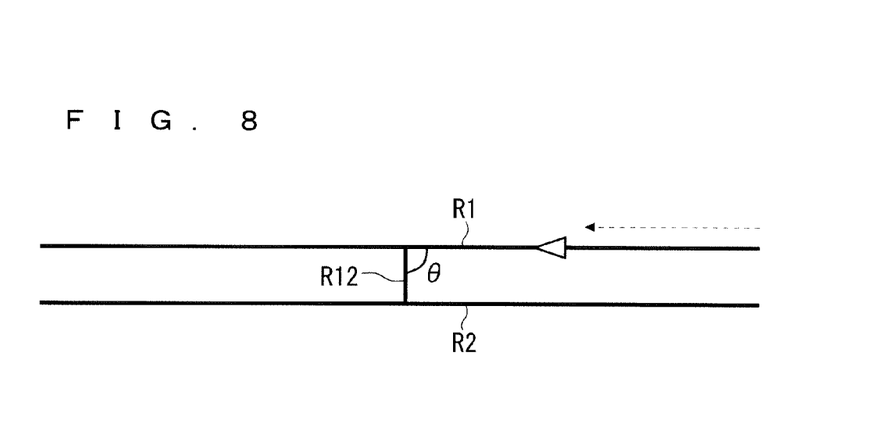
FIG. 8 A view describing an example in which the road shape conversion processing is applied to the connecting road between the main road and the side road.

As shown in FIG. 7, in a case where the road R1 that is the main road and the road R2 that is the side road extend in parallel and are connected to each other through the short road (connecting road) R12, such state is stored in the map data as shown in FIG. 8 in which the road R1 and the road R2 are connected to each other in a crank shape through the connecting road R12 and the road R1, the road R2, and the connecting road R12 form an "H" shape. In this case, the connection site of the road R1 and the connecting road R12 are not originally subjected to the branch determination processing because the road R1 and the connecting road R12 form the angle θ of approximately 90 degrees.

However, the distance between the main road and the side road (the distance corresponding to the length of the connecting road R12) is usually short, and thus, the vehicle crosses the connecting road R12 diagonally at the time of entry into the road R2 from the road R1, thereby leaving a trace similar to that in FIG. 1. Consequently, in this case as well, the determination that the vehicle keeps traveling on the road R1 may be erroneously provided in the usual vehicle position determination processing despite the vehicle's entry into the road R2.

Figure 9:
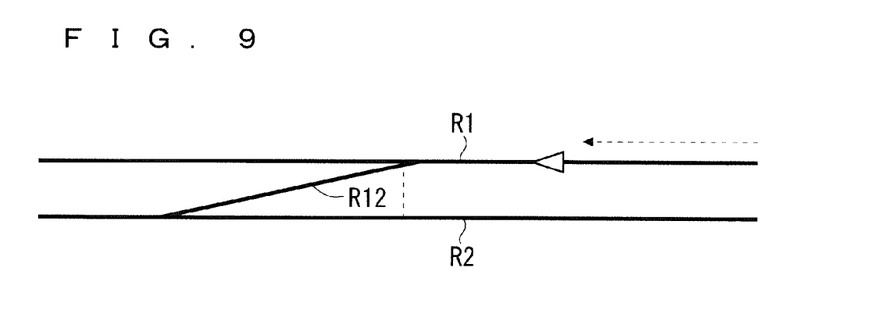
FIG. 9 A view describing an example in which the road shape conversion processing is applied to the connecting road between the main road and the side road.

Thus, the road shape conversion processing is applied to make a correction to the angle θ between the road R1 and the connecting road R12 such that the angle θ is set at an angle subjected to the branch determination processing (for example, equal to or smaller than 30 degrees), and then, the road data shown in FIG. 8 is converted into the shape shown in FIG. 9. Consequently, the branch determination processing is performed on the road R1 and the road R2 on the assumption that the road R2 and the connecting road R12 are the branch roads subjected to the branch determination processing, so that whether the vehicle is traveling on the main road or the side road can be accurately determined.

Meanwhile, the road shape conversion processing and the branch determination processing performed on the connection site of the roads extending in parallel may cause the following problem.

Figure 10:
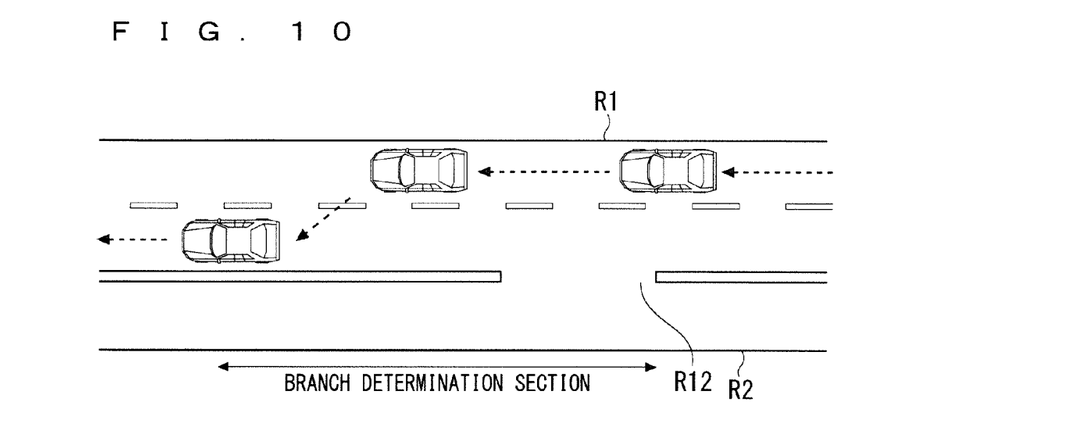
FIG. 10 A view describing a problem resulting from a vehicle position determination at a connection point of roads extending in parallel.
Figure 11:
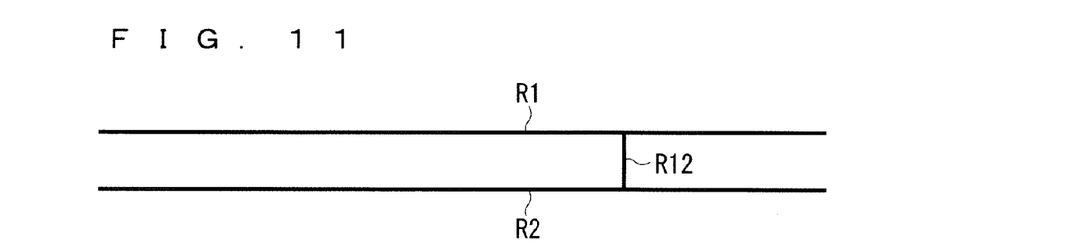
FIG. 11 A view describing a problem resulting from the vehicle position determination at the connection point of the roads extending in parallel.
Figure 12:
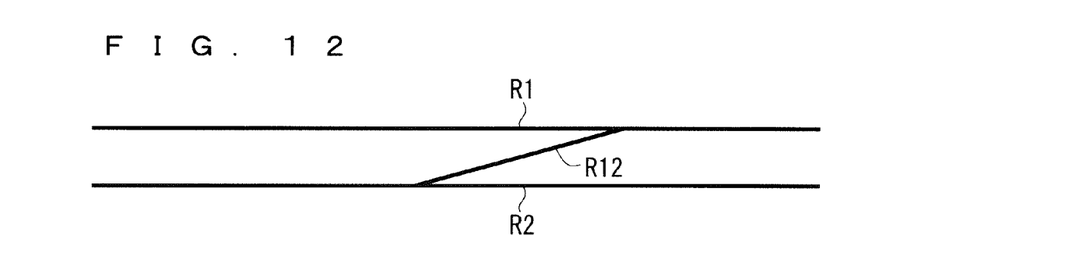
FIG. 12 A view describing a problem resulting from the vehicle position determination at the connection point of the roads extending in parallel.

For example, as shown in FIG. 10, in a case where the road R2 (side road) extends in parallel with the road R1 (main road) on which the vehicle is traveling and these roads are connected to each other through the connecting road R12, these roads are stored in the map data as the road data in the shape shown in FIG. 11. As a result of the road shape conversion processing performed on the road data, the road R1, the road R2, and the connecting road R12 are formed into the shapes shown in FIG. 12, so that the connection site of the road R1 and the connecting road R12 are subjected to the branch determination processing on the assumption that the road R2 and the connecting road R12 are the branch roads diverging from the road R1. As described above, in the branch determination processing, variations in the position and variations in the traveling direction of the vehicle in the branch determination section are separately accumulated, and at a time when the accumulated values exceed the respective threshold values, the determination that the vehicle has entered the road R2 assumed to be the branch road is provided.

Figure 13:
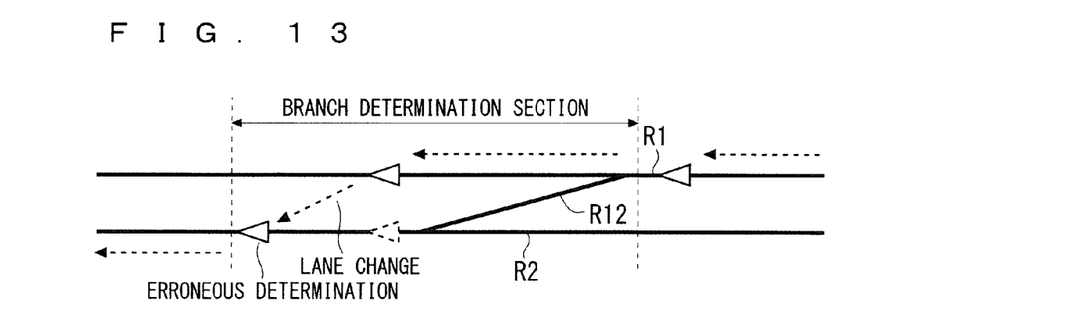
FIG. 13 A view describing a problem resulting from the vehicle position determination at the connection point of the roads extending in parallel.

Meanwhile, the vehicle does not always travel in the straight line on the road R1. Alternatively, the vehicle may make a lane change, for example, as shown in FIG. 10. If the position where the lane change is made is within in the branch determination section, the changes in the position and the traveling direction of the vehicle caused by the lane change affect the accumulated values in the branch determination processing. In particular, in a case of lane change made by the vehicle to the lane closer to the road R2 as shown in FIG. 10, the accumulated value of variations in the position of the vehicle and the accumulated value of variations in the traveling direction of the vehicle exceed the respective threshold values as a result of such lane change, and thus, the determination that the vehicle has entered the road R2 may be erroneously provided as shown in FIG. 13. The navigation apparatus capable of solving the problems including the above is proposed as described below.

Figure 14:
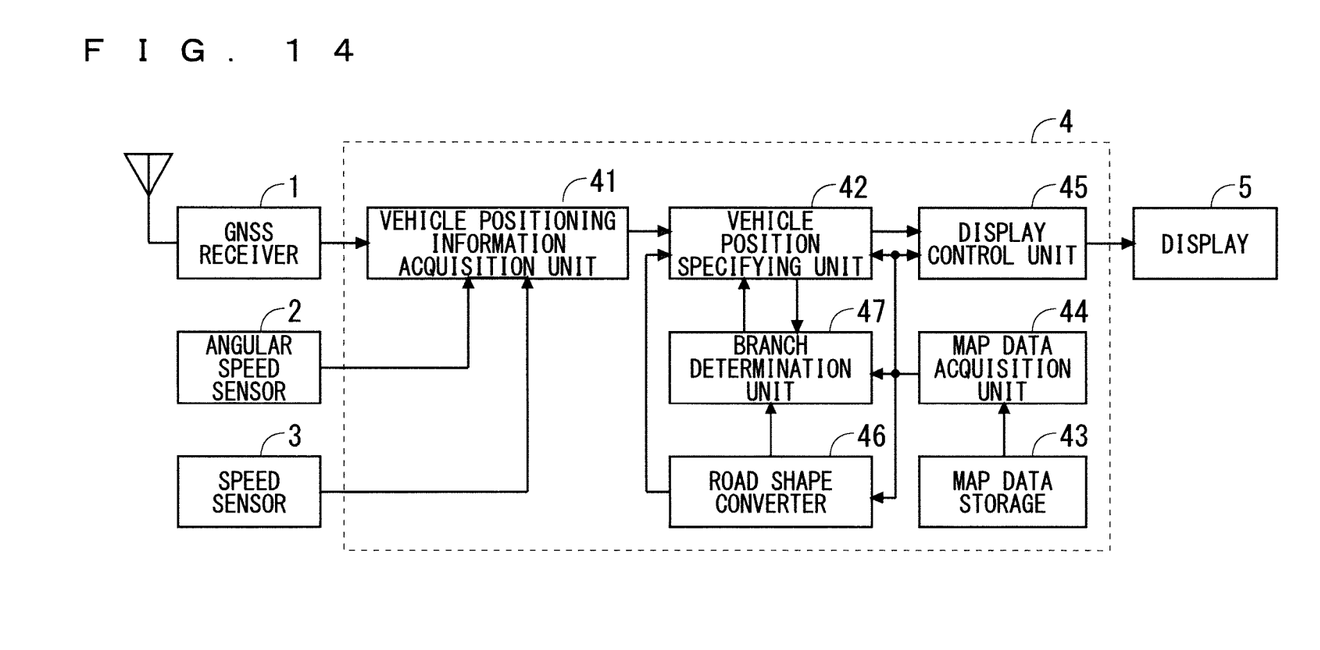
FIG. 14 A block diagram showing a configuration of a navigation apparatus according to embodiments of the present invention.

FIG. 14 is a block diagram showing a configuration of the navigation apparatus according to the embodiments of the present invention. The navigation apparatus according to the present embodiment includes a GNSS receiver 1, an angular speed sensor 2, a speed sensor 3, a vehicle position display controller 4, and a display 5.

The present embodiment is described on the supposition that the navigation apparatus is mounted on the vehicle. The GNSS receiver 1, the angular speed sensor 2, and the speed sensor 3 may be provided through the use of the equipment of the vehicle or may be embedded in the navigation apparatus.

The GNSS receiver 1 receives radio waves transmitted from a satellite with an antenna and generates a GNSS signal indicating its own current position. The angular speed sensor 2 detects the turn angle of the vehicle and generates an angular speed signal. The speed sensor 3 detects the speed of the vehicle and generates a speed signal. The GNSS signal generated by the GNSS receiver 1, the angular speed signal generated by the angular speed sensor 2, and the speed signal generated by the speed sensor 3 are transmitted to the vehicle position display controller 4 as the signals indicating the behavior of the vehicle.

The vehicle position display controller 4 controls the display 5, to thereby cause the display 5 to display the vehicle position and the map on its screen. The display 5 includes, for example, a liquid crystal display apparatus and displays various kinds of information on its screen in accordance with the display data output by the vehicle position display controller 4. For instance, the display 5 displays the image of the map having, for example, the current position of the vehicle and the route superimposed thereon. The display 5 may be the external display apparatus of the navigation apparatus.

Although the navigation apparatuses commonly have functions including, besides the displaying of vehicle position, the route retrieval and the route guidance, the present invention has little relevance to these functions, and thus, the constituent components having these functions are herein omitted from the drawings and the description.

The vehicle position display controller 4 includes a vehicle positioning information acquisition unit 41, a vehicle position specifying unit 42, a map data storage 43, a map data acquisition unit 44, a display control unit 45, a road shape converter 46, and a branch determination unit 47. The vehicle position display controller 4 includes, for example, a computer and the computer operates in accordance with the control program prestored in the storage medium, such as a memory, to thereby implement each of the components included in the vehicle position display controller 4.

The vehicle positioning information acquisition unit 41 acquires the information on the behavior of the vehicle from the GNSS signal output by the GNSS receiver 1 (the GNSS signal includes information on, for example, the current position, the traveling direction, the speed, and the GNSS radio wave reception status), the angular speed signal output by the angular speed sensor 2, and the speed signal output by the speed sensor 3. In particular, the vehicle positioning information acquisition unit 41 computes the speed of the vehicle and the travel distance of the vehicle per predetermined time period on the basis of the speed signal, calculates the turn angle of the vehicle per predetermined time period on the basis of the angular speed signal, and acquires, for example, the position, the traveling direction, and the speed of the vehicle from the GNSS signal. The information on the behavior of the vehicle acquired by the vehicle positioning information acquisition unit 41 is transmitted to the vehicle position specifying unit 42 as the positioning data.

The vehicle position specifying unit 42 specifies the vehicle position on the map by comparing the positioning data from the vehicle positioning information acquisition unit 41, the map data (road data) acquired by the map data acquisition unit 44 from the map data storage 43, the converted map data obtained through the road shape conversion processing performed by the road shape converter 46, and the vehicle position (currently traveled road) determined by the branch determination unit 47. The vehicle position on the map specified by the vehicle position specifying unit 42 is transmitted, as the vehicle position data, to the display control unit 45 and the branch determination unit 47.

The map data storage 43 includes the storage media, such as a hard disk, a removable disk, and a memory, and stores the map data containing the road data. The map data stored in the map data storage 43 is read out by the map data acquisition unit 44 and is transmitted to the vehicle position specifying unit 42, the display control unit 45, the road shape converter 46, and the branch determination unit 47.

The display control unit 45 generates, on the basis of the vehicle position data from the vehicle position specifying unit 42 and the map data acquired from the map data storage 43 through the map data acquisition unit 44, the display data for causing the display 5 to display the image indicating the vehicle position on the map (such as, the image in which, for example, an icon indicating the vehicle position is superimposed on the map). The display data generated by the display control unit 45 is transmitted to the display 5.

In a case where the connection point of the currently traveled road and the road extending in parallel with the currently traveled road lies ahead of the vehicle position, the road shape converter 46 performs the road shape conversion processing on the map data related to the connection part acquired from the map data storage 43. The converted map data is transmitted to the vehicle position specifying unit 42 and the branch determination unit 47.

When the vehicle passes through the connection site of the currently traveled road and the branch road branching off from the currently traveled road in a direction at an angle equal to or smaller than the predetermined angle, the branch determination unit 47 performs the branch determination processing on the basis of the vehicle position data from the vehicle position specifying unit 42, the map data acquired from the map data storage 43, and the map data converted by the road shape converter 46, to thereby determine which road the vehicle has entered. The determination results are transmitted to the vehicle position specifying unit 42.

Next, an operation of the navigation apparatus is described below.

During operation of the navigation apparatus, the vehicle positioning information acquisition unit 41 acquires the information (positioning data) on the behavior of the vehicle as required and transmits the information to the vehicle position specifying unit 42. The vehicle position specifying unit 42 specifies the vehicle position on the map on the basis of the positioning data from the vehicle positioning information acquisition unit 41, the road data of the predetermined range acquired from the map data storage 43, the map data converted by the road shape converter 46, and the determination results of the own vehicle position given by the branch determination unit 47. The vehicle position on the map specified by the vehicle position specifying unit 42 is transmitted to the display control unit 45 as the vehicle position data, and then, the display control unit 45 generates, on the basis of the vehicle position data, the display data of the image indicating the vehicle position on the map. The display 5 displays the image corresponding to the display data generated by the display control unit 45.

When the vehicle passes through the connection site of the currently traveled road and another road, the vehicle position specifying unit 42 determines which road the vehicle has entered on the basis of the positioning data. If the vehicle's entry is determined for a plurality of potential roads, the road having the strongest possibility of the vehicle's entry is specified as the current position.

In a case where the other road branches off from the currently traveled road at an angle equal to or smaller than the predetermined angle, the branch determination unit 47 performs the branch determination processing to determine which road the vehicle has entered, and then, the vehicle position specifying unit 42 specifies the vehicle position on the map.

In addition, even if the connection angle formed by the other road with the currently traveled road is greater than the predetermined angle, as long as these roads extend in parallel, the road shape converter 46 firstly performs the road shape conversion processing to convert the map data such that the other road is subjected to the branch determination processing. Then, the branch determination unit 47 performs the branch determination processing using the converted map data to determine which road the vehicle has entered and the vehicle position specifying unit 42 specifies the vehicle position on the map.

Unfortunately, in a case where the road on which the vehicle is traveling and another road connected to the road extend in parallel with a short distance therebetween, the road shape conversion processing and the branch determination processing performed in their entirety may cause the erroneous determination described with reference to FIGS. 10 to 13.

Thus, if the connection point of the currently traveled road and the road extending in parallel with the currently traveled road lies ahead of the vehicle position, the navigation apparatus according to the present embodiment places the following restrictions on the road shape conversion processing and the branch determination processing.

(1) In a case where the vehicle travels at a speed equal to or greater than the predetermined speed, the road shape conversion processing is not performed.

(2) In a case where the vehicle travels at a speed equal to or greater than the predetermined speed, as long as the road extending in parallel is wider than the defined width, the road shape conversion processing is performed.

(3) In a case where the branch determination processing is performed on the road assumed to be the subject of the branch determination processing (branch road) as a result of the road shape conversion processing, the section (branch determination section), for which variations in the position and variations in the traveling direction of the vehicle are accumulated, is set to be shorter than in a case where the usual branch determination processing is performed.

The limitation (1) is intended for, for example, the relation between the main road and the side road. In general, the vehicle is supposed to decelerate short of the connection site at the time of entry into the side road from the main road (in particular, this tendency is intensified in a case where the side road has a small width (where the side road is a narrow street)). That is, while the vehicle travels at a high speed, the probability is extremely low that the vehicle will enter the side road, and thus, there is no need to perform the road shape conversion processing.

Figure 15:
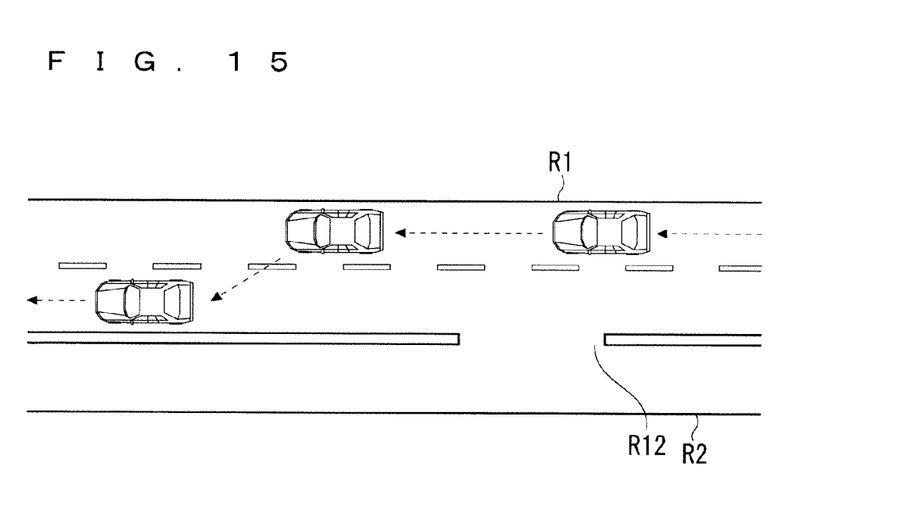
FIG. 15 A view describing effects of the present invention.
Figure 16:
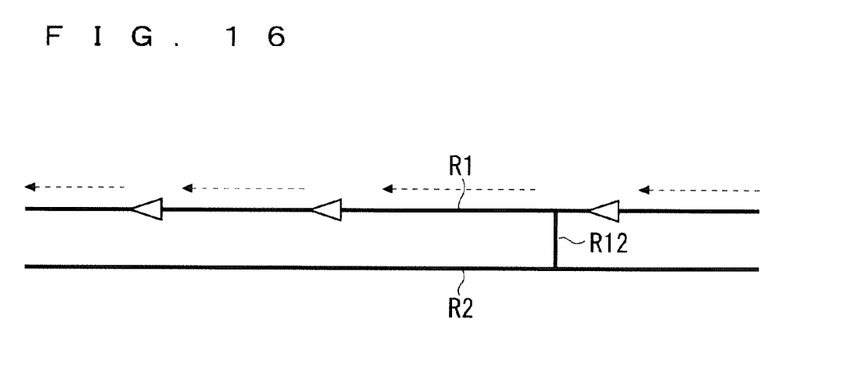
FIG. 16 A view describing effects of the present invention.

For example, as shown in FIG. 15, even if the road R2 extends in parallel with the road R1 on which the vehicle is traveling, as long as the vehicle travels at a speed equal to or greater than the predetermined speed, the road shape conversion processing is not performed and the usual vehicle position determination processing (in which variations in the position and variations in the traveling direction of the vehicle are not accumulated) is performed on the road data shown in FIG. 16. In this case, even if the vehicle makes a lane change on the road R1 as shown in FIG. 15, the determination that the vehicle position is on the road R1 as shown in FIG. 16 is provided, which avoids the erroneous determination shown in FIG. 13.

The limitation (2) is intended for the case where, for example, a wide road extends in parallel. In a case where a wide road extends in parallel as in a junction on an expressway, the vehicle may enter the adjacent road with little deceleration. If this is the case, the limitation (1) is removed.

Figure 17:
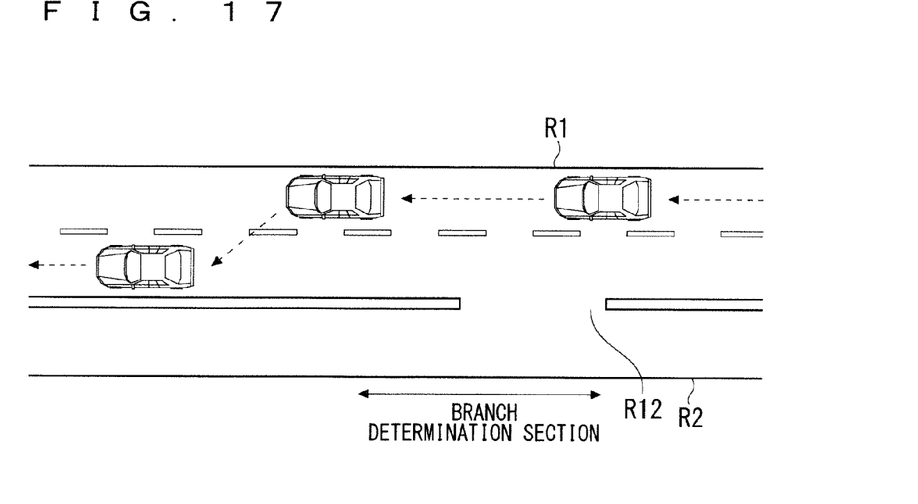
FIG. 17 A view describing effects of the present invention.
Figure 18:
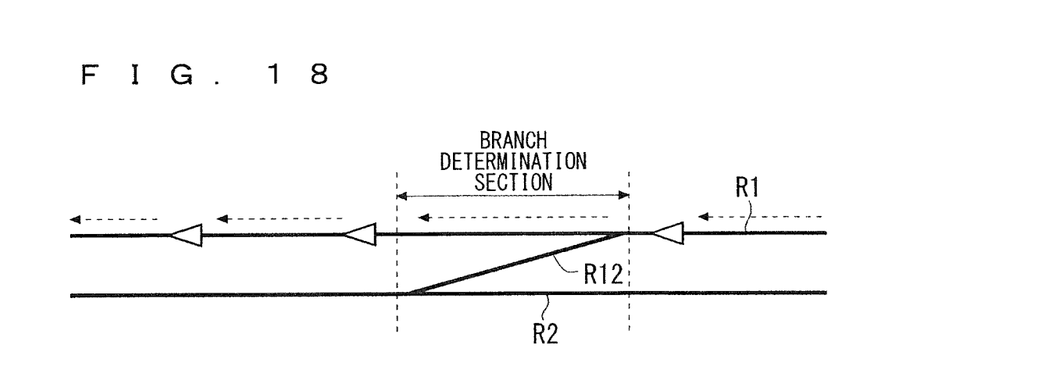
FIG. 18 A view describing effects of the present invention.

The limitation (3) is placed in order to prevent the erroneous determination shown in FIG. 13 from occurring in the branch determination processing that is performed after the road shape conversion processing. For example, as shown in FIG. 17, assume that the road R2 extends in parallel with the road R1 on which the vehicle is traveling. As a result of the road shape conversion processing performed on the connection part, the road data shown in FIG. 18 is generated, so that the condition of the limitation (3) is met and the branch determination section is accordingly set to be shorter than that in a case where the usual branch determination processing (which does not undergo the road shape conversion processing) is performed. Owing to the shortened branch determination section, even if the vehicle makes a lane change on the road R1 as shown in FIG. 17, the determination that the vehicle position is on the road R1 as shown in FIG. 18 is provided, which avoids the erroneous determination shown in FIG. 13.

Figure 19:
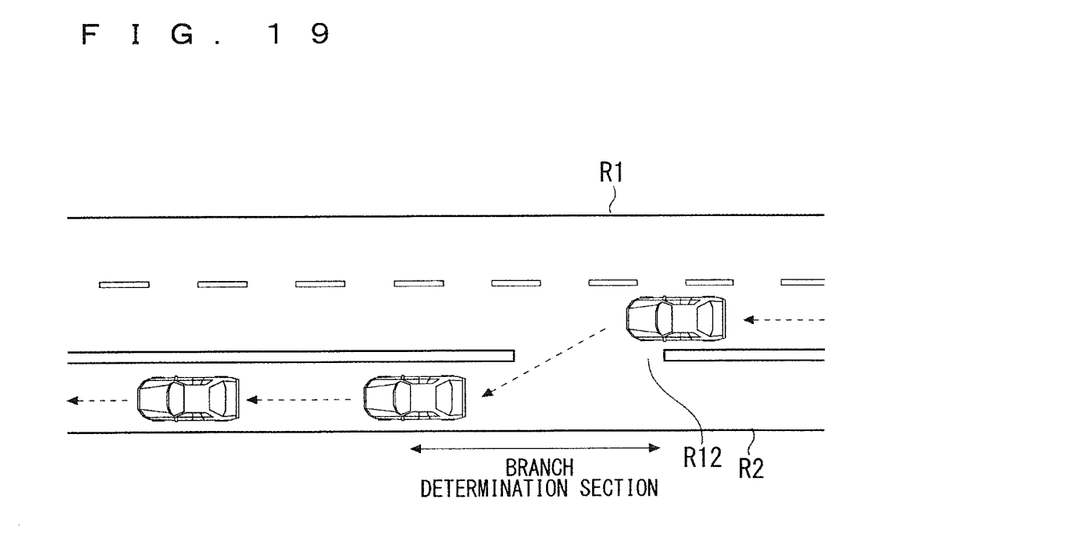
FIG. 19 A view describing effects of the present invention.
Figure 20:
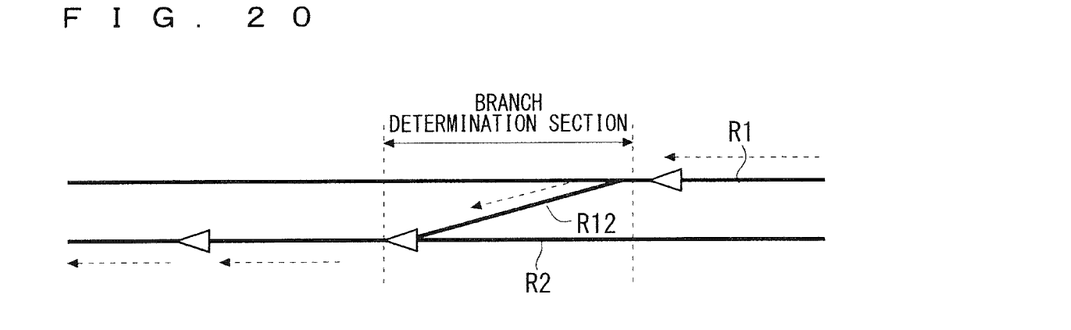
FIG. 20 A view describing effects of the present invention.

Unlike in the case of the vehicle's entry into the branch road subjected to the usual branch determination processing, when the vehicle enters the road that has been assumed to be the branch road as a result of the road shape conversion processing, the section in which the position and the traveling direction of the vehicle change is considered to be short (the change in the behavior of the vehicle is considered to be clear), and thus, the sufficient degree of accuracy is provided in the branch determination processing even if the branch determination section is shortened. Thus, when the vehicle enters the road R2 from the road R1 as shown in FIG. 19, the vehicle position is accurately determined as shown in FIG. 20.

Figure 21:
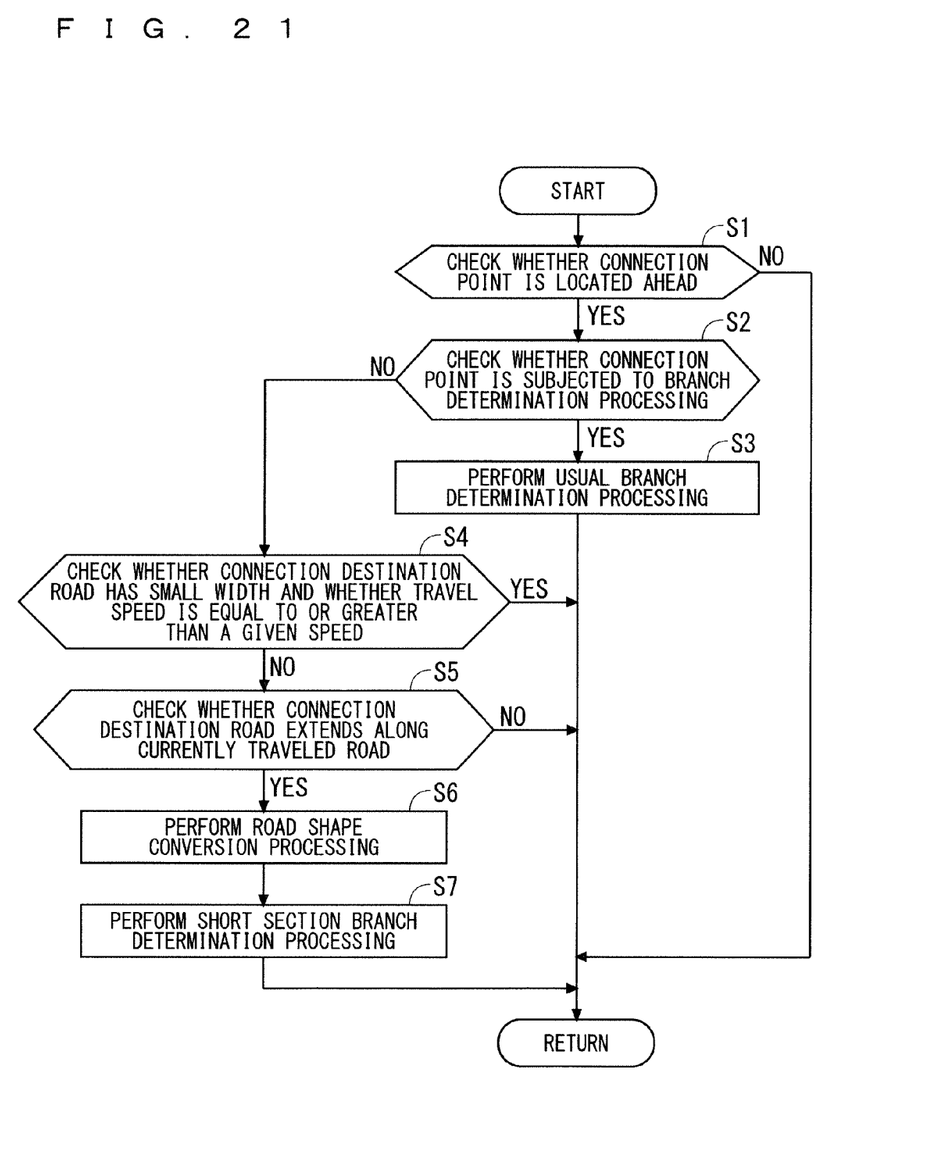
FIG. 21 A flowchart showing an operation of the navigation apparatus according to the embodiments of the present invention.

FIG. 21 is a flowchart showing the operation of the navigation apparatus according to the present embodiment and illustrates the processing (entry road determination processing) of determining which road the vehicle has entered at the connection site of the currently traveled road and another road. The processing in FIG. 21 is called and executed, on a regular basis, by the main program that specifies the vehicle position.

According to the entry road determination processing, in a case where the connection site of the currently traveled road and the road extending in parallel lies ahead of the vehicle position, the road shape conversion processing and the branch determination processing with the limitations (1) to (3) placed thereon are performed.

Firstly, the navigation apparatus compares the current position of the vehicle and the map data to check whether any connection point of the currently traveled road and another road lies ahead of the vehicle position (Step S1). If no connection point lies ahead of the vehicle position (NO in Step S1), the navigation apparatus ends the entry road determination processing (the operation returns to the main program that has called the entry road determination processing). In this case, the usual vehicle position determination processing (in which variations in the position and variations in the traveling direction of the vehicle are not accumulated) is performed.

If a connection point lies ahead of the vehicle position (YES in Step S1), the navigation apparatus checks whether the other road connected to the currently traveled road is subjected to the branch determination processing. If the other road is connected to the currently traveled road at an angle equal to or smaller than the predetermined angle (for example, equal to or smaller than 30 degrees), the other road is subjected to the branch determination processing. If the connection point ahead of the vehicle position is subjected to the branch determination processing (YES in step S2), the navigation apparatus performs the usual branch determination processing (which does not undergo the road shape conversion processing) (Step S3).

If the connection point ahead of the vehicle position is not subjected to the branch determination processing (NO in step S2), the navigation apparatus checks whether the other road (connection destination road) connected to the connection point has a width equal to or smaller than the predetermined value and whether the vehicle speed is equal to or greater than the predetermined speed (Step S4). If the conditions in Step 4 are met (YES in Step S4), the navigation apparatus ends the branch determination processing and performs the usual vehicle position determination processing. This corresponds to the case where the condition of the limitation (1) is met and the condition of the limitation (2) is not met. The determination may be made on the basis of the number of lanes or the road types in place of the road width.

If the conditions in the Step S4 are not met (NO in Step S4), the navigation apparatus checks whether the connection destination road extends in parallel with the currently traveled road (whether the extending directions of the roads agree with each other) (Step S5). The extending direction of the road may be determined on the basis of the entering direction and the leaving direction of the road (the orientations of the both ends of the road). If the connection destination road does not extend in parallel with the currently traveled road (NO in Step S5), the navigation apparatus ends the branch determination processing and performs the usual vehicle position determination processing.

If the connection destination road extends in parallel with the currently traveled road (YES in Step S5), the navigation apparatus performs the road shape conversion processing on the connecting road (Step S6). Then, the navigation apparatus performs the branch determination processing on the map data that has undergone the road shape conversion processing (Step S7). This case meets the condition of the limitation (3), and thus, in Step S7, the navigation apparatus performs the branch determination processing (short section branch determination processing) in which the branch determination section is set to be shorter than that in a case where the usual branch determination processing is performed (Step S3).

According to the entry road determination processing in FIG. 21, the road shape conversion processing and the branch determination processing with the limitations (1) to (3) placed thereon are performed, which prevents the occurrence of the erroneous determination described with reference to FIGS. 10 to 13.

<Modifications>

Although the limitations (1) to (3) placed on the entry road determination processing have been factored in the above-described embodiment, the limitations (4) to (6) described below may be further placed.

(4) In a case where the branch determination processing is performed on the road that has been assumed to be the branch road as a result of the road shape conversion processing, the branch determination section is set to be shorter with increasing distance between the currently traveled road and the road extending in parallel.

(5) In a case where the branch determination processing is performed on the road that has been assumed to be the branch road as a result of the road shape conversion processing, the branch determination section is set to be shorter with increasing travel speed of the vehicle.

(6) In a case where the distance between the currently traveled road and the road extending in parallel is greater than the defined distance, the road shape conversion processing is not performed.

The limitation (4) is intended for, for example, the case where the road extending in parallel is apart from the currently traveled road and the road (for example, the connecting road R12 in FIG. 8) extending therebetween is long. In a case where the road extending in parallel is apart from the currently traveled road, the change in the behavior at the time of the vehicle's entry into the road extending in parallel is clear, and thus, the sufficient degree of accuracy is provided in the branch determination processing even if the branch determination section is shortened.

The limitation (5) is based on the idea similar to that of the limitation (1). The probability that the vehicle will enter another road decreases with increasing travel speed of the vehicle, and thus, the sufficient degree of accuracy is provided in the branch determination processing even if the branch determination section is shortened.

The limitation (6) is based on the idea similar to that of the limitation (4). In a case where the currently traveled road and the road extending in parallel are far apart, the change in the behavior of the vehicle at the time of the vehicle's entry into the road extending in parallel is extremely clear, and thus, the sufficient degree of accuracy is provided in the usual branch determination processing, eliminating the need for the road shape conversion processing.

The navigation apparatus described above is applicable not only to the on-vehicle navigation apparatus but also to the navigation apparatus formulated as a system by combining, for example, a portable navigation device (PND) and a portable terminal (such as a mobile cellular phone, a smartphone, and a tablet) that can be mounted on the vehicle, and a server as appropriate. If this is the case, the respective functions or the respective constituent components of the navigation apparatus described above are dispersedly located in the devices constituting the system.

As another embodiment, for example, the vehicle position display controller 4 is provided in the portable terminal and the display apparatus mounted on the vehicle is used as the display 5. If this is the case, a part of the vehicle position display controller 4 may be disposed in the server. For example, the map data storage 43 is disposed on the server side to provide a system in which the map data is delivered from the server, whereby the capacity of the memory medium necessary for the portable terminal can be reduced.

In the present invention, each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS

1 GNSS receiver, 2 angular speed sensor, 3 speed sensor, 4 vehicle position display controller, 5 display, 41 vehicle positioning information acquisition unit, 42 vehicle position specifying unit, 43 map data storage, 44 map data acquisition unit, 45 display control unit, 46 road shape converter, 47 branch determination unit.

The invention claimed is:

1. A vehicle position display controller that causes a display apparatus to display a map and a position of a vehicle, said controller comprising:
 a computer to execute a program; and
 a memory to store the program which, when executed by the computer, results in performance of steps comprising, acquiring map data;

specifying a position of a vehicle;

acquiring variations in the position and variations in a traveling direction of said vehicle;

performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle; and subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle, wherein in a case where said vehicle travels at a speed equal to or greater than a predetermined speed, said correction is not made.

2. The vehicle position display controller according to claim 1, wherein in a case where said road extending in parallel has a width smaller than a defined width and said vehicle travels at a speed equal to or greater than the predetermined speed, said correction is not made.

3. The vehicle position display controller according to claim 1, wherein in performing the branch determination processing on said road extending in parallel assumed to be the branch road, the section, for which the variations in the position and the variations in the traveling direction of said vehicle are accumulated, is set to be shorter than that in a case where usual branch determination processing is performed.

4. The vehicle position display controller according to claim 3, wherein in performing the branch determination processing on said road extending in parallel assumed to be the branch road, the section, for which the variations in the position and the variations in the traveling direction of said vehicle are accumulated, is set to be shorter with increasing distance between said currently traveled road and said road extending in parallel.

5. The vehicle position display controller according to claim 1, wherein in performing the branch determination processing on said road extending in parallel assumed to be the branch road, the section, for which the variations in the position and the variations in the traveling direction of said vehicle are accumulated, is set to be shorter with increasing travel speed of said vehicle.

6. The vehicle position display controller according to claim 1, wherein in a case where a distance between said currently traveled road and said road extending in parallel is greater than a defined distance, said correction is not made regardless of a travel speed of said vehicle.

7. A vehicle position display controller that causes a display apparatus to display a map and a position of a vehicle, said controller comprising:

a computer to execute a program; and a memory to store the program which, when executed by the computer, results in performance of steps comprising, acquiring map data;

specifying a position of a vehicle;

acquiring variations in the position and variations in a traveling direction of said vehicle;

performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle; and subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle, wherein in performing the branch determination processing on said road extending in parallel assumed to be the branch road, the section, for which the variations in the position and the variations in the traveling direction of said vehicle are accumulated, is set to be shorter than that in a case where usual branch determination processing is performed.

8. The vehicle position display controller according to claim 7, wherein in performing the branch determination processing on said road extending in parallel assumed to be the branch road, the section, for which the variations in the position and the variations in the traveling direction of said vehicle are accumulated, is set to be shorter with increasing distance between said currently traveled road and said road extending in parallel.

9. The vehicle position display controller according to claim 7, wherein in a case where a distance between said currently traveled road and said road extending in parallel is greater than a defined distance, said correction is not made.

10. A vehicle position display controller that causes a display apparatus to display a map and a position of a vehicle, said controller comprising:

a computer to execute a program; and a memory to store the program which, when executed by the computer, results in performance of steps comprising, acquiring map data;

specifying a position of a vehicle;

acquiring variations in the position and variations in a traveling direction of said vehicle;

performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle; and subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle, wherein in performing the branch determination processing on said road extending in parallel assumed to be the branch road, the section, for which the variations in the position and the variations in the traveling direction of said vehicle are accumulated, is set to be shorter with increasing travel speed of said vehicle.

11. The vehicle position display controller according to claim 10, wherein in a case where a distance between said currently traveled road and said road extending in parallel is greater than a defined distance, said correction is not made.

12. A vehicle position specifying method for specifying a position of a vehicle, said method comprising:
specifying a position of a vehicle;
acquiring variations in the position and variations in a traveling direction of said vehicle;
performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle; and
subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle,
wherein in a case where said vehicle travels at a speed equal to or greater than a predetermined speed, said correction is not made.

13. A vehicle position specifying method for specifying a position of a vehicle, said method comprising:
specifying a position of a vehicle;
acquiring variations in the position and variations in a traveling direction of said vehicle;
performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle;
subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle; and
setting, in performing the branch determination processing on said road extending in parallel assumed to be the branch road, the section, for which the variations in the position and the variations in the traveling direction of said vehicle are accumulated, to be shorter than that in a case where usual branch determination processing is performed.

14. A vehicle position specifying method for specifying a position of a vehicle, said method comprising:
specifying a position of a vehicle;
acquiring variations in the position and variations in a traveling direction of said vehicle;
performing, at a time when said vehicle passes through a connection point of a currently traveled road and a branch road that branches off from the currently traveled road in a direction at an angle equal to or smaller than a predetermined angle, a branch determination processing of determining whether said vehicle has entered said branch road on the basis of results obtained by accumulating, for a section including said connection point, the variations in the position and the variations in the traveling direction of said vehicle;
subjecting, in a case where a connecting road through which said currently traveled road is connected to a road extending in parallel with said currently traveled road lies ahead of the position of said vehicle, said road extending in parallel to said branch determination processing on the assumption that said road extending in parallel is the branch road by making a correction to an angle between said currently traveled road and said connecting road such that the angle is equal to or smaller than said predetermined angle; and
setting, in performing the branch determination processing on said road extending in parallel assumed to be the branch road, the section, for which the variations in the position and the variations in the traveling direction of said vehicle are accumulated, to be shorter with increasing travel speed of said vehicle.

* * * * *